United States Patent
Grigoras et al.

(10) Patent No.: US 11,718,697 B2
(45) Date of Patent: *Aug. 8, 2023

(54) MULTI-STAGE LATEX PARTICLES WITH PEG IN OUTER STAGE

(71) Applicant: Columbia Insurance Company, Omaha, NE (US)

(72) Inventors: Cristian Grigoras, Suffern, NY (US); Yong Yang, Hillsborough, NJ (US); Rogina Saad, Ottsville, PA (US); Richard Geurtsen, Robbinsville, NJ (US)

(73) Assignee: Columbia Insurance Company, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,119

(22) Filed: Aug. 8, 2022

(65) Prior Publication Data
US 2022/0403085 A1 Dec. 22, 2022

Related U.S. Application Data

(63) Continuation of application No. 16/965,800, filed as application No. PCT/US2019/015181 on Jan. 25, 2019, now Pat. No. 11,447,591.

(60) Provisional application No. 62/625,390, filed on Feb. 2, 2018.

(51) Int. Cl.
| | |
|---|---|
| *C08L 13/02* | (2006.01) |
| *C08F 265/06* | (2006.01) |
| *C08F 220/28* | (2006.01) |
| *C08F 220/14* | (2006.01) |
| *C09D 151/00* | (2006.01) |
| *C08F 283/06* | (2006.01) |

(52) U.S. Cl.
CPC .......... *C08F 265/06* (2013.01); *C08F 220/14* (2013.01); *C08F 220/286* (2020.02); *C08F 283/06* (2013.01); *C08L 13/02* (2013.01); *C09D 151/003* (2013.01)

(58) Field of Classification Search
CPC .. C08F 265/06; C08F 220/14; C08F 220/286; C08F 283/06; C08L 13/02; C09D 151/003
USPC ......................................................... 523/201
See application file for complete search history.

(56) References Cited

U.S. PATENT DOCUMENTS

| | | | | |
|---|---|---|---|---|
| 5,610,225 A | * | 3/1997 | Farwaha ............ | C09D 133/066 524/558 |
| 6,410,655 B2 | * | 6/2002 | Okubo ................. | C08L 51/003 526/318.42 |
| 7,612,126 B2 | * | 11/2009 | Roschmann ....... | C09D 151/003 524/529 |
| 9,527,942 B2 | * | 12/2016 | Wu ...................... | C09D 151/08 |
| 11,447,591 B2 | * | 9/2022 | Grigoras ............... | C08F 265/06 |
| 2008/0058473 A1 | * | 3/2008 | Freidzon ............... | C08F 265/04 525/191 |
| 2009/0186968 A1 | * | 7/2009 | Zong ........................ | C08F 2/24 524/375 |

\* cited by examiner

*Primary Examiner* — Hannah J Pak
(74) *Attorney, Agent, or Firm* — The H.T. Than Law Group

(57) ABSTRACT

Disclosed herein is an aqueous latex composition comprising a substantially acrylic core-shell latex, wherein a water-retaining monomer is copolymerized to the shell. The Tg of the core ranges from about 0° C. to about 12° C., and the Tg of the shell ranges from about 13° C. to about 40° C. The mean volume average particle size of the latex ranges from about 125 nm to about 200 nm. The core-shell latex comprises at least one acrylic monomer having a solubility that ranges about 10 g/L to about 30 g/L at 30° C., and this at least one acrylic monomer is present in the shell polymer in an amount greater than about 50 wt. % of all monomers in the shell. Preferably, the at least one acrylic monomer is methyl methacrylate.

15 Claims, No Drawings

MULTI-STAGE LATEX PARTICLES WITH PEG IN OUTER STAGE

The present application is a continuation application and claims the benefit of priority under 35 U.S.C. § 120 of U.S. Ser. No. 16/965,800, filed on Jul. 29, 2020, which claims priority to international patent application number PCT/US2019/015181, filed on Jan. 25, 2019, which claims benefit of provisional application No. 62/625,390, filed on Feb. 2, 2018. All priority patent applications are incorporated herein by reference in their entireties.

FIELD OF THE INVENTION

The present invention relates to improving properties of low VOC aqueous architectural compositions incorporating multi-stage latex polymers, including improved scrubability, stain removal, freeze thaw stability and increase open time.

BACKGROUND OF THE INVENTION

With the trend of low and zero VOC waterborne coatings for environmental consideration and market competition, a number of coating properties are compromised, such as freeze thaw stability and open time, due to significant reduction of organic solvents. The common practice to improve freeze thaw stability and open time is to introduce freeze thaw and open time additives into low and zero VOC coating formulations. These additives are typically alkyl or aralkyl polyethers, similar to nonionic surfactants. However, these additives are not bound to the film-forming binder and may migrate. These additives also have limited efficacy, and could impose other problems of coating properties, such as water sensitivity and scrub resistance, etc.

Polyether monomers have been copolymerized with binder monomers to form the film-forming resins to chemically bound the polyether monomers to the film forming resin to prevent migration. Chemically binding the polyethers to the film forming resin is disclosed in the patent literature, such as U.S. Pat. Nos. 9,527,942; 5,610,225; 6,410,655; and 7,612,126, among others.

However, due to various reasons the solutions proposed in the patent literature produce paint films that have insufficient ability to resist mechanical scrubbing and to resist stains.

Hence, there remains a need for architectural compositions that overcome these known drawbacks in the art.

SUMMARY OF THE INVENTION

The coating composition of the invention exhibits good freeze thaw stability, longer open time, better scrub resistance, better stain removal and other desirable coatings properties.

In one embodiment, the present invention is directed to an aqueous latex composition comprising a substantially acrylic core-shell latex, wherein a water-retaining monomer is copolymerized to the shell. The Tg of the core ranges from about 0° C. to about 12° C., and the Tg of the shell ranges from about 13° C. to about 40° C. The mean volume average particle size of the latex ranges from about 125 nm to about 200 nm. The core-shell latex comprises at least one acrylic monomer having a solubility that ranges about 10 g/L to about 30 g/L at 30° C., and this at least one acrylic monomer is present in the shell polymer in an amount greater than about 50 wt. % of all monomers in the shell.

Preferably, the Tg of the shell is higher than the Tg of the core by at least about 3° C., or by at least about 10° C., or by at least about 20° C. Preferably, the particle size ranges from about 125 nm to about 175 nm, or from about 130 nm to about 160 nm, or from about 130 nm to about 150 nm.

The solubility of the at least one acrylic monomer may range from about 12 g/L to about 18 g/L, or from about 14 g/L to about 16 g/L. The at least one acrylic monomer may be present in the shell polymer in an amount greater than about 55 wt. %, or in an amount greater than about 60 wt. %, or in an amount greater than about 65 wt. %. In a preferred embodiment, said at least one acrylic monomer is methyl methacrylate.

The water-retaining monomer may comprises an ethylene oxide or a propylene oxide, and be present in the shell in an amount from about 1% to about 5% by weight, or in an amount from about 1% to about 3% by weight, or in an amount from about 1% to 2% by weight.

DETAILED DESCRIPTION OF THE PREFERRED EMBODIMENTS

One embodiment of the present invention relates to an aqueous latex dispersion comprising an emulsion polymer copolymerized with at least one water retaining monomer, including but not limited to ethylene oxide and propylene oxide. Preferably, the polymer particles that are polymerized in at least two stages so as to form two or more distinct phases. The first phase is typically a bulk or core polymer, which preferably is a substantially acrylic copolymer. The second phase is a surface or shell polymer, which preferably is also a substantially acrylic copolymer copolymerized with this water retaining monomer, so that the water retaining monomer is bonded to the surface of the latex particles.

A conventional acrylic latex polymerization typically involves a single charge of emulsified monomer or a monomer mix that is introduced, initiated, and polymerized to form latex particles. However, a two-stage sequential latex polymerization according to the invention can involve the following: a first introduction, initiation, and polymerization of a first charge of monomers to form the first phase; and, thereafter, introduction of a second charge of monomers (or continue the introduction of the first charge of monomers) or monomer emulsion and co-polymerization of that second charge of monomers with the first phase to form a second phase.

A two-stage sequential latex polymerization according to the invention can occur in the following manner. First, an initial kettle charge containing water, optionally but preferably a surfactant, and optionally a buffer like sodium bicarbonate, is placed in a reaction vessel (i.e. reactor) and brought to a polymerization temperature with nitrogen purge. The polymerization temperature can be tailored to the particular initiators/monomers in the polymerization. For example, when sodium persulfate is used as the initiator for acrylic monomers, the polymerization temperature can be between about 70° C. and about 90° C., preferably between about 75° C. and about 85° C., and more specifically about 80° C. When the initial kettle charge and the reaction vessel are at temperature, a seed amount of a first emulsion containing water, a surfactant, a first mixture of monomers, additional additives, and optionally a pH adjustor can then be added. A first initiator solution containing water and persulfate initiator can thereafter be added to the emulsion. A seed amount of monomer, in combination with the initiator solution, should be sufficient to allow the polymerization to begin. In one embodiment, the seed amount can represent about 1% to about 10%, for example from about 3% to about 6%, of the weight of the first emulsion. The proportion of monomers added in this first emulsion can ideally represent the desired composition of the first phase.

Typically, a short period of time such as about 15 minutes is allowed for the initiator solution and the monomer emulsion to reach the polymerization temperature and for the polymerization to begin. Thereafter, the remainder of the first emulsion can be added to the reaction vessel, either continuously or in multiple sequential charges, along with a second initiator solution containing water and sodium persulfate. The first emulsion can advantageously contain at least about 10 wt. %, preferably at least about 25 wt. %, more preferably at least about 40 wt. % or at least about 50% of the total monomer content. The first emulsion can also advantageously contain no more than about 90 wt. %, preferably no more than about 80 wt. %, more preferably no more than about 70 wt. % of the total monomer content.

When all of the first emulsion has been added, a second emulsion (or the remainder of the first emulsion with or without another emulsion) is simultaneously added with the second initiator solution. The second emulsion contains water, a surfactant, a second mixture of monomers, additional additives, and optionally a pH adjustor. The rates of addition of the first and second emulsions and the second initiator solution containing water and sodium persulfate can advantageously be tailored to be appropriate to the reaction conditions and the nature of the reactants in the polymerization. Nevertheless, the rate of addition of the second initiator solution should typically be such that the second initiator solution is co-added during both the addition of the remainder of the first emulsion and the addition of the second emulsion.

In one embodiment, the sequential addition of the monomer emulsions can occur for a period of about 2 to about 5 hours, preferably from about 3 to about 4 hours, for example about 3.5 hours. After the additions of monomer and initiator have ended, a sufficient polymerization time is allowed. This polymerization time can be, in one embodiment, from about ½ hour to about 2 hours, for example about 1 hour.

The inventive latex is sequentially polymerized in at least two stages so as to form at least two distinct phases: the first phase may be a core and the second phase may be a shell, whereby the core is the result of the first phase of the sequential emulsion polymerization, and the shell is the result of the second phase of the sequential emulsion polymerization. The relative positions of the first and second phases of the polymer particles can be internal and external, e.g., core and shell, as well as neighboring, e.g., side-by-side, dependent on how the first and second phases of the polymerization are performed. Preferably, the relative positions of the first and the second phases of the polymer particles are internal and external. As used herein, the terms core and shell also include the side-by-side configuration.

After the polymerization has run its course, optionally but preferably, a two-part chaser system can be co-added to the reaction vessel. The first part of the chaser system is a solution containing water, a redox initiator system comprising an oxidizing agent (e.g. tert-butyl hydroperoxide), and optionally a surfactant. The second part is comprised of water, a reducing agent (e.g. a sodium salt of an organic sulfinic acid derivative), and optionally a surfactant. The primary purpose of the chaser solution, when present, is to react with, and thus devolatilize, any residual monomers and/or low molecular weight oligomers from the polymerization. Following the optional addition of the chaser solution, a stabilizing solution containing water and a pH adjustor, as well as a biocide/preservative can optionally be added to the reaction vessel to help stabilize the latex emulsion.

In one embodiment, a paint composition or other architectural composition containing the inventive core-shell latex particles can be formulated according to the following method. First, a pigment dispersion composition, or grind, is formed by: combining water, a dispersant, a pH adjustor, surfactant, defoamer, colorant/pigment, optionally a plasticizer, and a biocide/preservative; stirring and optionally grinding for a period of time to sufficiently mix the ingredients; and, while continuing to stir and/or grind, adding more water. To this pigment dispersion composition can be added a latex containing sequentially polymerized polymer particle according to the invention, followed by a pH adjustor, if desired, and a performance additive composition comprising an organic solvent, a surfactant, and a defoamer. Optionally but preferably, an anticorrosive solution can then be added. Then, a rheology modifier can be added, optionally including more water, if desired, and also a pH adjustor, thus forming a paint composition. Furthermore, if desired, more colorant(s) and/or pigment(s) can be added to the paint composition either to compliment the (white) pigment(s)/colorant(s) already in the pigment dispersion composition or to add another desired color to the paint composition.

In another embodiment, the inventive core-shell latex aqueous composition comprises sequentially polymerized polymer latex particles having a core and a shell, wherein the core polymer is polymerized from a first set of acrylic monomers, and the shell polymer is polymerized from a second set of acrylics and about 1% to about 5% by weight or about 1% to about 3% or preferably from about 1% to 2% by weight of a water retaining monomer. The shell preferably contains about 1% to about 60% of all the weight of the core-shell latex, and can be in the range of about 20% to about 50% and more preferably about 25% to about 45% of the weight of the latex. The core would make up the remaining weight.

Suitable emulsion latex particles include but are not limited to acrylic, vinyl, vinyl-acrylic or styrene-acrylic polymers or copolymers. The latex particles coalesce and/or crosslink to form a paint film on a substrate. Latexes made principally from acrylic monomers are preferred for the present invention, as illustrated in the Examples below. Exemplary, non-limiting monomers suitable to form the emulsion latex particles for the present invention are described below.

Any acrylic monomers can be used in the present invention. Suitable acrylic monomers include, but are not limited to methyl acrylate, ethyl acrylate, methyl methacrylate, and ethyl methacrylate, butyl acrylate and butyl methacrylate, iso-octyl methacrylate and acrylate, lauryl acrylate and lauryl methacrylate, 2-ethyl hexyl acrylate, stearyl acrylate and methacrylate, isobornyl acrylate and methacrylate, methoxy ethyl acrylate and methacrylate, 2-ethyoxy ethyl acrylate and methacrylate, 2-hydroxyethyl acrylate, 2-hydroxybutyl, dimethylamino ethyl acrylate and methacrylate, acrylates, alkyl(meth) acrylic acids such as methyl acrylic acids, wet adhesion monomers, such as N-(2-methacryloyloxyethyl)ethylene urea, and multifunctional monomers such as divinyl benzene, diacrylates, for crosslinking functions etc., acrylic acids, ionic acrylate salts, alkacrylic acids, ionic alkacrylate salts, haloacrylic acids, ionic haloacrylate salts, acrylamides, alkacrylamides, monoalkyl acrylamides, monoalkyl alkacrylamides, alkyl acrylates, alkyl alkacrylates, acrylonitrile, alkacrylonitriles, dialkyl acrylamides, dialkyl alkacrylamides, hydroxyalkyl acrylates, hydroxyalkyl alkacrylates, only partially esterified acrylate esters of alkylene glycols, only partially esterified acrylate esters of non-polymeric polyhydroxy compounds like glycerol, only partially esterified acrylate esters of polymeric polyhydroxy compounds, and combinations thereof. The alkyl methacrylate monomer is preferably methyl methacrylate.

Preferred monomers containing aromatic groups are styrene and α-methylstyrene. Other suitable monomers containing aromatic groups include, but are not limited to, 2,4-diphenyl-4-methyl-1-pentene, 2,4-dimethyl styrene, 2,4,6-trimethylstyrene, 2,3,4,5,6-pentafluorostyrene, (vinylbenzyl)trimethylammonium chloride, 2,6-dichlorostyrene, 2-fluorostyrene, 2-isopropenylaniline, 3(trifluoromethyl)styrene, 3-fluorostyrene, α-methylstyrene, 3-vinylbenzoic acid, 4-vinylbenzyl chloride, α-bromostyrene, 9-vinylanthracene, and combinations thereof.

Preferred monomers containing primary amide groups are methacrylamide, and acrylamide. Other suitable monomers containing amide groups include, but are not limited to, N-vinylformamide, or any vinyl amide, N,N-dimethylacrylamide, N-(1,1-dimethyl-3-oxobutyl)(meth)acrylamide, N-(hydroxymethyl)(meth)acrylamide, N-(3-methoxypropyl)acrylamide, N-(butoxymethyl)acrylamide, N-(isobutoxymethyl)acryl(methacryl)amide, N-[tris(hydroxymethyl)methyl]acryl(methacryl)amide, 7-[4-(trifluoromethyl)coumarin](meth)acrylamide, 3-(3-fluorophenyl)-2-propenamide, 3-(4-methylphenyl)acrylamide, N-(tert-butyl)(meth)acrylamide, and combinations thereof. These monomers can be polymerized with acrylic monomers, listed above. General formula for vinyl(form)amides:

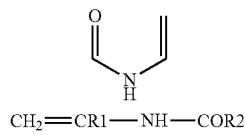

and (meth)acrylamides:

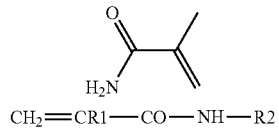

where R1 is H, CH$_3$, CH$_2$CH$_3$, or other substituted functional groups, and R2 can be —H, —CH$_3$, —CH$_2$CH$_3$, and other substituted organic functional groups.

In one embodiment, styrene monomers, such as styrene, methylstyrene, chlorostyrene, methoxystyrene and the like, are preferably co-polymerized with methacrylamide and acrylamide monomers.

In one embodiment, the aqueous latex polymer may also comprise vinyl monomers. Monomers of this type suitable for use in accordance with the present invention include any compounds having vinyl functionality, i.e., —CH═CH$_2$ group. Preferably, the vinyl monomers are selected from the group consisting of vinyl esters, vinyl aromatic hydrocarbons, vinyl aliphatic hydrocarbons, vinyl alkyl ethers and mixtures thereof.

Suitable vinyl monomers include vinyl esters, such as, for example, vinyl propionate, vinyl laurate, vinyl pivalate, vinyl nonanoate, vinyl decanoate, vinyl neodecanoate, vinyl butyrates, vinyl caproate, vinyl benzoates, vinyl isopropyl acetates and similar vinyl esters; nitrile monomers, such as acrylonitrile, methacrylonitrile and the like; vinyl aromatic hydrocarbons, such as, for example, styrene, methyl styrenes and similar lower alkyl styrenes, chlorostyrene, vinyl toluene, vinyl naphthalene and divinyl benzene; vinyl aliphatic hydrocarbon monomers, such as, for example, vinyl chloride and vinylidene chloride as well as alpha olefins such as, for example, ethylene, propylene, isobutylene, as well as conjugated dienes such as 1,3-butadiene, methyl-2-butadiene, 1,3-piperylene, 2,3-dimethyl butadiene, isoprene, cyclohexene, cyclopentadiene, and dicyclopentadiene; and vinyl alkyl ethers, such as, for example, methyl vinyl ether, isopropyl vinyl ether, n-butyl vinyl ether, and isobutyl vinyl ether.

The water retaining monomers or hydrophilic monomers copolymerized to the shell are preferably polyether derivatives of free radical polymerizable compounds such as acrylic, methacrylic, maleic and itaconic acids, vinyl alcohol, allyl alcohol and styrene. The polyethers include homopolymers of ethylene oxide and water soluble copolymers of ethylene oxide with propylene and butylene oxides. The molecular weight of the polyether is from about 200 to about 10,000 Daltons, or about 300 to about 7,000 Daltons, preferably 400 to 4000 Daltons, and more preferably 400 to 1000 Daltons. The termini ω to the free radical polymerizable residue may be a hydroxyl moiety. Alternatively, it may be esterified or etherified with a C1 to C6 carboxylic acid or alcohol, respectively. In another embodiment, the termini ω to the free radical polymerizable residue may be esterified with an inorganic acid, such as phosphorous acid, phosphonic acid, phosphoric acid, sulfurous acid and sulfuric acid; these inorganic acids may be further neutralized with alkali such as ammonium hydroxide, sodium hydroxide or potassium hydroxide.

These monomers are polyether derivatives of monoesters of mono- and dicarboxylic acids, diesters of dicarboxylic acids, and mixtures thereof such as acrylic, methacrylic, maleic and itaconic acids. The oxyalkylene functional monomer copolymerizes with the acrylic, vinyl or styrene type of monomer and thus becomes incorporated into the backbone of the emulsion polymer. Examples include monomers sold by GEO Specialty Chemical, such as BISOMER® PEM4, PEG200DMA, MPEG350MA, MPEG550MA, PEA6, PEM6, PEM63P, S10W and S20W, and by Evonik, as VISIOMER® C18 PEG 1105 MA W, MPEG 750 MA W, MPEG 2005 MA W, and MPEG 5005 MA W All are polyethylene glycol derivatives of acrylic or methacrylic acids. These water-retaining monomers or hydrophilic monomers have the general structural formulas:

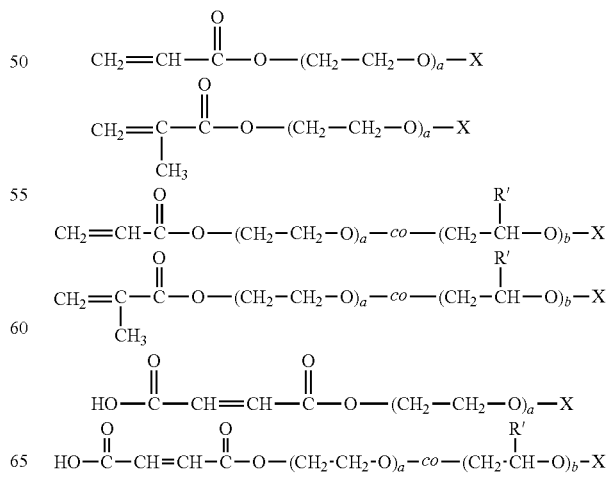

Wherein R' is —CH₃ or —C₂H₅; X is selected from the group consisting of —H, —CH₃, —C₂H₅, —C₄H₉, —C₆H₁₃, —Cl, —Br, —CN, Phosphonate (—PO₃"M+), Phosphate (PO₄' M+), Sulfate (SO₄" M+), Sulfonate (SO₃"M+), carboxylate (COO" M+), a nonionic group, and a quaternary ammonium ion, wherein M+ is a cation; a and b is an integer of from 1 to 200, and a+b≤200. The polyethers include homopolymers of ethylene oxide and water soluble copolymers of ethylene oxide with propylene and butylene oxide. The molecular weight of the polyether is from about 400 to about 8000 Daltons, preferably about 400 to about 4000 Daltons, and more preferably about 400 to about 1000 Daltons. The water retaining monomers will be polymerized with other monomers and incorporated into the polymer backbone of the invention.

In some of the formulas above, the CH₃ moiety can be replaced by hydrogen H.

At least one water-retaining surface-active vinyl monomer (also known as a non-self-polymerizable ethylenically-unsaturated surfactant or a reactive surfactant) may also be copolymerized with the shell polymer, as shown in some of the Examples below. Surface-active vinyl monomers will hereinafter be referred to as a reactive surfactant. The reactive surfactant will be copolymerized with other monomers and incorporated into the polymer of the invention. Reactive surfactants possessing, for example, isopropenylphenyl or allyl groups are preferred. Examples include reactive surfactants sold by PPG Industries, Inc., as MAZON® SAM 181, 183, 184, 211 surfactants which are anionic sulfates or sulfonates and MAZON® SAM 185-187 surfactants which are nonionic surfactants. Other reactive surfactants include the macro monomers sold by Daiichi Kogyo Seiyaku under the names NIOGEN RN, AQUARON or HITENOL BC and KH surfactants. These include polyoxyethylene alkyl phenyl ether compounds of the general formulas:

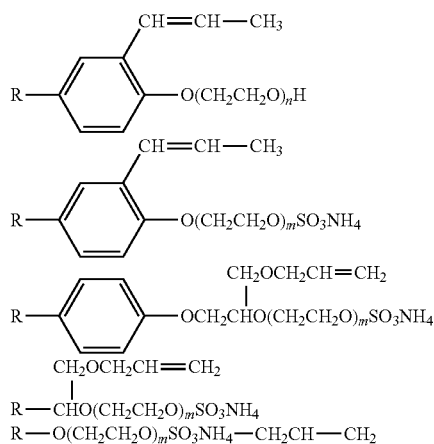

In these Formulas, R is nonyl or octyl, and n and m are preferably integers of from 10 to 50 and 10 to 40, respectively. More preferably, n ranges from 10 to 20, and m from 10 to 20. HITENOL RN, HITENOL KH-0, HITENOL BC10, HITENOL BC20, HITENOL HS-20 and HITENOL A-10 products are particularly preferred reactive surfactants. Other such reactive surfactants include the sodium alkyl allyl sulfosuccinate sold by Henkel, under the trade name TREM LF40 surfactant.

Experimental Procedures and Results. The polymers of the invention were prepared by emulsion polymerization. Comparative examples were polymerized as single stage polymers and inventive examples were polymerized as multi-stage and preferably two-stage polymers.

The freeze-thaw 3-cycle test utilized in the present invention comprises freezing and thawing the latex compositions three times. The pre-test viscosity in Krepps units (KU) is compared to the post-test viscosity. If the change in viscosities is less than 10 KU then the latex composition passes the F-T stability test. Optionally, a drawdown of the tested latex or paint composition is performed and the dry film is inspected to check for specks of agglomerated paint materials. The paint compositions that pass the F-T 3-cycle test would form smooth paint films without specks. Alternatively, ASTM-D2243 standard can be used to determine F-T stability.

The present inventors discovered in a series of experiments conducted, as Examples 10-13, on latex compositions to be included in primer-type paint compositions. A two-stage latex with a relatively small amount of water retaining monomer, i.e., polyethylene glycol (PEG), preferably a MPEG750MA, of about 0.74 wt. % of the total monomers, passes the 3-cycle freeze-thaw test with a significant amount of MMA in the shell and no styrene in the latex (Example 11). However, when MMA was removed from the latex and styrene is added, the latex could no longer pass the same freeze-thaw test, even at more than twice the amount of PEG (Example 12). When a small amount of MMA is reintroduced to the shell replacing some of the styrene, the latex with substantially the same amount of PEG again passes the freeze-thaw test (Example 13). Comparative Example 10 is a single stage substantially all acrylic latex with no PEG. Data from these experiments is summarized below in Table 1.

As reported in Tables 1 and 2, the amounts of monomers reported are weights of solids in grams, and the Tg are calculated using the Fox Equation and reported in degrees Celsius. The particle sizes (PS) are mean volume average and measured in nm. The amount of shell MMA is also included in the total amount of acrylics in the shell. The MPEG750MA % or PEG % reported is the (solid only) weight % of the PEG from the total solid monomers, including acrylics, styrene, WAM and PEG in the latex.

TABLE 1

| | | | | | | | | | | | |
|---|---|---|---|---|---|---|---|---|---|---|---|
| F-T Stability Experiments for Primer Paint Compositions ||||||||||||
| Example | Core acrylic | Core styrene | Shell acrylic | Shell styrene | Shell MMA | PEG % | F-T | PS | Tg core | Tg shell | Tg latex |
| C10 | 916 | 0 | n/a | n/a | n/a | 0 | Fail | 155 | −9 | n/a | −9 |
| 11 | 523 | 0 | 393 | 0 | 217 | 0.74% | PASS | 109 | −28 | 16 | −11 |

TABLE 1-continued

F-T Stability Experiments for Primer Paint Compositions

| Example | Core acrylic | Core styrene | Shell acrylic | Shell styrene | Shell MMA | PEG % | F-T | PS | Tg core | Tg shell | Tg latex |
|---|---|---|---|---|---|---|---|---|---|---|---|
| 12 | 288 | 72 | 110 | 94 | 0 | 1.69% | Fail | 111 | −23 | 12 | −11 |
| 13 | 288 | 72 | 147 | 57 | 37 | 1.84% | PASS | 190 | −23 | 12 | −11 |

While these latex polymers have Tg below 0° C. and shell Tg below 0° C. and hence outside of the present invention as discussed further below, they show that while MMA (Tg ~105° C.) and styrene (Tg ~100° C.) monomers may have similar Tg, the MMA is better suited for freeze-thaw application.

Without being bound to any particular theory, the present inventors believe that MMA provide unexpected F-T stability. A conventional method of providing F-T stability is to copolymerize a PEG (or PPG or other water retaining monomers) such as MPEG of lower molecular weight, as disclosed in the prior art references listed above, to achieve F-T stability and then reducing the amount of PEG until F-T stability is lost. The lowest amount of PEG that maintains F-T stability is typically high and the latex polymers made with this amount of PEG are uneconomical due to the amount of PEG needed. One solution is to have a harder shell, i.e., lower Tg in the core and higher Tg in the shell with an optional polymerizable surfactant in order to minimize agglomeration or clustering of the latex particles. Additionally, the present inventors discovered that reducing the hydrophobicity (or increasing the hydrophilicity) of the shell monomers also improves F-T stability. The hydrophilicity attracts water molecules to the surface or the shell of the latex thereby making these water molecules unavailable to form ice crystal, i.e., to resist freezing. MMA being more hydrophilic than 2EHA or styrene, as shown herewithin, exhibits improved F-T stability. The present invention is not limited only to MMA; film forming monomers, including but not limited to acrylic monomers, having similar hydrophilicity and hardness are also suitable and are within the present invention.

The present inventors then applied their invention and discovery to topcoat paint compositions, e.g., paint compositions that are painted on top of the primer paint films of Examples 10-13. Top coat paint compositions present other challenges, such as scrubability or the ability to resist scrubs, and stain removal. Examples 1-9, as summarized in Table 2, are substantially all acrylic paints. MMA and BA are the primary film forming monomers with smaller amounts of MAA and MPEG750MA as the PEG, as the other monomers. Comparative Example 1 is a single stage polymer presented to show a base line scrubability and stain removal capability. Examples 2-4 vary the amount of MMA in the shell, while keeping the amount of PEG and BA substantially unchanged in the shell. Example 5 has a thin shell with only MMA and PEG. Examples 6 and 7 reduce the amount of PEG until the latex fails the F-T stability test. Examples 8 and 9 have the substantially the same amount of PEG as Examples 6 and 7, respectively but with more MMA in the shell.

TABLE 2

F-T Stability Experiments for Topcoat Paint Compositions

| Example | Core MMA | Core BA | Shell MMA | Shell BA | Shell PEG | PEG % latex | MMA % Shell | PEG % Shell | MMA/BA shell | F-T | PS | Tg core | Tg shell | Tg latex | Stain removal | Scrubability |
|---|---|---|---|---|---|---|---|---|---|---|---|---|---|---|---|---|
| C1 | 593 | 522 | 0 | 0 | 0 | 0.00 | 0 | 0 | n/a[1] | F | 139 | 11 | n/a | 11 | 4.5 | 1120 |
| 2 | 445 | 392 | 148 | 131 | 45 | 1.94 | 25 | 8 | 1.13 | P | 137 | 11 | 15 | 12 | 7.67 | 940 |
| 3 | 362 | 392 | 231 | 131 | 45 | 1.94 | 39 | 6 | 1.76 | P | 143 | 3 | 30 | 12 | 7.95 | 1327 |
| 4 | 396 | 392 | 187 | 131 | 45 | 1.95 | 32 | 7 | 1.43 | P | 143 | 10 | 22 | 11 | 8.93 | 1012 |
| 5 | 528 | 522 | 55 | 0 | 45 | 1.95 | 9 | 29 | n/a[2] | P | 145 | 10 | 22 | 11 | 5.39 | 1212 |
| 6 | 445 | 392 | 148 | 131 | 33 | 1.43 | 25 | 6 | 1.13 | P | 134 | 11 | 14 | 11 | 5.85 | 1163 |
| 7 | 445 | 392 | 148 | 131 | 25 | 1.09 | 25 | 4 | 1.13 | F | 135 | 11 | 13 | 11 | 6.35 | 1230 |
| 8 | 362 | 392 | 231 | 131 | 33 | 1.43 | 39 | 4 | 1.76 | P | 141 | 3 | 29 | 11 | 5.99 | 1472 |
| 9 | 362 | 392 | 231 | 131 | 25 | 1.09 | 39 | 3 | 1.76 | P | 138 | 3 | 29 | 11 | 4.63 | 1326 |

[1] single stage latex
[2] pure MMA shell

Scrubability test results show the number of scrub cycles before failure and the test is conducted pursuant to ASTM D2486 Method B.

The stain removal test conducted in these experiments corresponds to the Master Paint Institute (MPI) COR-MTD-119 standard. Higher values indicate that the stains were more difficult to remove from the paint film. Lower values are more preferred. The numbers reported are the sum of the changes in color readings (Delta E values in CIE2000 units) of a pre-stained paint film and post-stained-and-washed paint film after a number of different stains are applied to the paint film. The stains include hot regular coffee, red cooking wine, tomato ketchup, yellow mustard and graphite. The cleaning solution comprises 0.5% nonyl phenoxy ethanol, 0.25% trisodium phosphate (TSP) and 99.25% deionized water. The cleaning solution is applied by a 430 g sponge/holder for 500 cycles. The changes of color caused by each stain are added and reported for each Example. Alternatively, a less preferred and less stringent stain removal test, MPI COR-MTD-083, can also be used.

The data in Table 2 shows that when the PEG makes up about 1.5 wt. % or above of the total monomers, the two-stage latexes pass the F-T test (Examples 2-5), even when the shell is thin and is mostly MMA, e.g., about 8% of total monomers (Example 5). The ratio of MMA to BA in the shell in these Examples ranges from near parity at about 1.13 to about 1.76 or significantly more MMA than BA.

When the amount of PEG is about 1.4 wt. % of the total monomers (Examples 6 and 8), the two-stage latex passes the F-T test at MMA/BA ratio near parity or when the MMA is significantly higher than BA.

When the amount of PEG is reduced (Examples 7 and 9) to about 1 wt. % of the total monomers, the two-stage latex fails the F-T test if the MMA/BA ratio is near parity at about 1.13, but passes the F-T test if the MMA is significantly higher than BA at a ratio of about 1.76.

Examples 6-9 confirm the finding that MMA plays a significant role in helping latexes pass the F-T stability test, when the PEG is copolymerized on the surface of the latex, i.e., on the shell of two-stage or multi-stage latex particles.

The stain removal property is worse when the PEG wt. % is higher, i.e., more than 1.5 wt. % (Examples 2-5), but is better when the PEG wt. % is lower, i.e., less than 1.5 wt. % (Examples 6-9). However, other properties also affect the scrubability and stain removal paint film properties, as discussed below.

Additional observations can be made from Table 2. Abridged versions of Table 2 are shown below to highlight these observations. From Examples 2, 6 and 7, for the same level of MMA in the shell and variable level of PEG in the shell higher MMA/PEG ratio is better for mechanical properties, but below a certain PEG amount the latex loses F-T stability.

| Example | Core MMA | Core BA | Shell MMA | Shell BA | Shell PEG | PEG % latex | MMA % Shell | PEG % Shell | MMA/BA shell | F-T | PS | Tg core | Tg shell | Tg latex | Stain removal | Scrubability |
|---|---|---|---|---|---|---|---|---|---|---|---|---|---|---|---|---|
| 2 | 445 | 392 | 148 | 131 | 45 | 1.94 | 25 | 8 | 1.13 | P | 137 | 11 | 15 | 12 | 7.67 | 940 |
| 6 | 445 | 392 | 148 | 131 | 33 | 1.43 | 25 | 6 | 1.13 | P | 134 | 11 | 14 | 11 | 5.85 | 1163 |
| 7 | 445 | 392 | 148 | 131 | 25 | 1.09 | 25 | 4 | 1.13 | F | 135 | 11 | 13 | 11 | 6.35 | 1230 |

From Examples 2, 3 and 4, for the same PEG and BA levels in the shell and variable MMA level, more hydrophobicity results in better cleanability but lower scrubability.

| Example | Core MMA | Core BA | Shell MMA | Shell BA | Shell PEG | PEG % latex | MMA % Shell | PEG % Shell | MMA/BA shell | F-T | PS | Tg core | Tg shell | Tg latex | Stain removal | Scrubability |
|---|---|---|---|---|---|---|---|---|---|---|---|---|---|---|---|---|
| 2 | 445 | 392 | 148 | 131 | 45 | 1.94 | 25 | 8 | 1.13 | P | 137 | 11 | 15 | 12 | 7.67 | 940 |
| 3 | 362 | 392 | 231 | 131 | 45 | 1.94 | 39 | 6 | 1.76 | P | 143 | 3 | 30 | 12 | 7.95 | 1327 |
| 4 | 396 | 392 | 187 | 131 | 45 | 1.95 | 32 | 7 | 1.43 | P | 143 | 10 | 22 | 11 | 8.93 | 1012 |

From Examples 7, 8 and 9, for the same BA level in the shell and higher MMA and lower MPEG, the latex passes F-T stability and achieves good cleanability/stain removal and scrubability. Higher MMA amount results in higher Tg (Examples 8 and 9 versus Example 7) and lower PEG amount with higher MMA amount (Example 9 versus Example 8) results in better stain removal. A balancing between MMA and PEG may provide an optimal or preferred embodiment.

| Example | Core MMA | Core BA | Shell MMA | Shell BA | Shell PEG | PEG % latex | MMA % Shell | PEG % Shell | MMA/BA shell | F-T | PS | Tg core | Tg shell | Tg latex | Stain removal | Scrubability |
|---|---|---|---|---|---|---|---|---|---|---|---|---|---|---|---|---|
| 7 | 445 | 392 | 148 | 131 | 25 | 1.09 | 25 | 4 | 1.13 | F | 135 | 11 | 13 | 11 | 6.35 | 1230 |
| 8 | 362 | 392 | 231 | 131 | 33 | 1.43 | 39 | 4 | 1.76 | P | 141 | 3 | 29 | 11 | 5.99 | 1472 |
| 9 | 362 | 392 | 231 | 131 | 25 | 1.09 | 39 | 3 | 1.76 | P | 138 | 3 | 29 | 11 | 4.63 | 1326 |

From Examples 3, 8 and 9, for the same MMA/BA ratio in the shell (and same level of MMA), less PEG amount appears to be better for scrubability and cleanability/stain removal with F-T stability maintained.

| Example | Core MMA | Core BA | Shell MMA | Shell BA | Shell PEG | PEG % latex | MMA % Shell | PEG % Shell | MMA/BA shell | F-T | PS | Tg core | Tg shell | Tg latex | Stain removal | Scrubability |
|---|---|---|---|---|---|---|---|---|---|---|---|---|---|---|---|---|
| 3 | 362 | 392 | 231 | 131 | 45 | 1.94 | 39 | 6 | 1.76 | P | 143 | 3 | 30 | 12 | 7.95 | 1327 |
| 8 | 362 | 392 | 231 | 131 | 33 | 1.43 | 39 | 4 | 1.76 | P | 141 | 3 | 29 | 11 | 5.99 | 1472 |
| 9 | 362 | 392 | 231 | 131 | 25 | 1.09 | 39 | 3 | 1.76 | P | 138 | 3 | 29 | 11 | 4.63 | 1326 |

The Tg and solubility in water of the acrylic monomers used in the present invention are listed in Table 3 to illustrate the discussion below. As used herein, solubility is an indication of the degree of hydrophilicity and hydrophobicity. Lower solubility indicates more hydrophobic and higher solubility indicates more hydrophilic. Solubility information was obtained from www.ncbi.nlm.nih.gov/pccompound. Tg information was obtained from www3.nd.edu/~hgao/thermal_transitions_of_homopolymers.pdf, or from www.wernerblank.com/equat/Fox_equation15.htm.

TABLE 3

Solubility and Tg of Selected Acrylic Monomers

| Monomer | Solubility in Water at T ° | Tg (° C.) |
| --- | --- | --- |
| BA | 2 g/L at 23° C. | −54 |
| 2-EHA | Negligible | −50 |
| MMA | 15 g/L at 30° C. | 105 |
| MAA | 89 g/L at 20° C. | 228 |
| Styrene | 0.3 g/L at 25° C. | 100 |

The present inventors noted that a higher Tg in the shell polymer would help with the F-T stability and paint film properties. Higher Tg yields a harder latex and a stronger paint film. As shown in Table 3, MMA and styrene have significantly high Tg relative to the other acrylic monomers. MAA has the highest Tg, but it is only used in small amount due to its high hydrophilicity and for other reasons related to the polymerization process. Since the Tg of styrene is about 100° C. similar to that the Tg of MMA is about 105° C., a shell rich in styrene should have good F-T stability and paint film properties. However, as shown in Example 12 where a solution of styrene/MPEG was added to the monomer mix to form the shell and the amounts of styrene and acrylics are close to parity and no MMA is present in the shell or the core, the latex fails the F-T stability despite the relatively high PEG wt. %. Furthermore, the particle size was too small, i.e., less than 120 nm or between 110 and 120 nm, to form a mechanically stable paint film. The present inventors believe that the relative hydrophobicity of styrene relative to acrylics causes the particle size to be low, and low particle size correlates to low mechanical stability and F-T stability. Under this observation, the Tg or hardness of the latex polymer and particle size have influence over the mechanical and F-T stabilities of the latex polymer and the physical properties of the film.

Under another observation, the present inventors observed that while MMA and styrene have similar Tg, they behave very differently in the Examples. Examples 11 and 12 show that the latex with MMA in the shell can help a latex passes the F-T stability with a lower PEG wt. %, but in the absence of MMA the latex with significant amount of styrene the latex and with twice the PEG wt. % fails the F-T test. An addition of a small amount of MMA (Example 13) helps a latex similar to that of Example 12 passes the F-T stability test.

This observation of the benefits of MMA even without styrene was confirmed in Examples 1-9. The latexes in Examples 1-9 were made principally with MMA and BA. Examples 7 and 9 show that about 1 wt. % of PEG fails the F-T test when the MMA and BA are near parity. However, with increased MMA substantially the same latex passes the F-T test. Hence, in addition to Tg/hardness and particle size from the first observation, the hydrophilicity/hydrophobicity of the latex also affect the F-T stability of the latex.

However, as shown in Examples 2-9, the mean volume average particle size was between 125 nm and 200 nm. As stated above, particle size lower than 120 nm cannot form a mechanically and F-T stable film. Particles larger than 200 nm were not produced in the Examples presented herein. The present inventors believe that for emulsion latex systems with film forming monomers that are substantially all acrylic, e.g., greater than 95% of all film forming monomers, particle size greater than 200 nm would require more rheological modifiers or thickeners. Higher amounts of rheological modifiers add to the costs of the paint formulations and the added rheological modifiers also "dilute" the polymers in the paint yielding thereby lowering dry film performance(s).

The inventive aqueous latex compositions and the architectural/paint compositions that incorporate them have better colligative properties with the preferred particle sizes than with the larger particle sizes. Those of ordinary skill in the art would understand that the colligative properties of a solution depend on the number of solute particle to the number of solvent molecules and not on the type of chemical species. Hence, the preferred range of particles size in the inventive aqueous latex compositions would give a higher number of solute/latex particles than the larger (e.g., >200 nm) particle size. Solutions with lower number of larger solutes require more rheological modifiers. On the other hand, latex particles with smaller particle size require less rheological modifiers as their viscosity is higher than latex particles of similar concentration but with larger particle size. Hence, the latexes of the present invention yield paint formulations that require less rheological modifiers to produce optimal rheological profiles and characteristics.

The present inventors have identified at least the following: (i) the Tg of the core, shell and/or entire latex, (ii) the particle size (PS) and (iii) the hydrophobicity/hydrophobicity of at least one species of acrylic monomers expressible as solubility in water, as the factors that can be varied, as discussed herein; to produce mechanically stable and F-T stable latex particles in accordance with the present invention.

Two-stage latex polymers that do not pass the free-thaw 3-cycle test are outside of the invention.

Two-stage latex polymers that are too soft, i.e., having a core Tg less than 0° C. or having a latex Tg less than 0° C., do not have sufficient scrubability are also outside of the present invention. Tg in the core is preferably greater than about 0° C. and less than about 12° C. The Tg in the shell is preferably greater than 13° C. and less than about 40° C. The Tg of the shell is higher than the Tg of the core by at least about 3° C., or by at least about 10° C., or at least about 20° C.

Two-stage latex polymers that have particle size larger than those shown in the Examples, e.g., larger than 200 nm, are also outside of the present invention. More specifically, the [mean volume average] particle size of the inventive two-stage latex particles is preferably less than about 200 nm, more preferably less than about 175 nm and more preferably less than about 150 nm. Preferably, the particle size is greater than about 125 nm. A preferred range for particle size would be from about 125 nm to about 175 nm, more preferably from about 130 nm to about 160 nm, more preferably from about 130 nm to about 150 nm.

The hydrophilicity of the specific species of acrylic monomer used in the Examples, i.e., MMA, as expressed in its solubility of water is about 15 g/L at 30° C. Suitable solubility in water may range from about 10 g/L to about 30 g/L, preferably from about 12 g/L to about 25 g/L or 12 g/L to 18 g/LL, more preferably from about 14 g/L to about 16 g/L, all at 30° C. This acrylic species should be present in the shell polymer in an amount greater than about 50 wt. % of all monomers in the shell, preferably greater than about 55 wt. % or 60 wt. % or 65 wt. %.

The present inventors also believe that two-stage substantially acrylic polymers with a water-retaining monomer copolymerized to the shell having the preferred particle sizes, Tg and solubility in water, described herein advantageously produce paint film that have desirable dry paint film properties, such as scrubability, toughness and stain removability without having to copolymerize a cross-linkable monomer and having to include a cross-linking agent in the aqueous solution. While cross-linkable monomer and cross-linking agents can be used to increase film scrubability as discussed below, in the preferred embodiments of the present invention they are not used, as shown in the Examples below.

Each of the Examples discussed above is described below. The particle size (PS) reported herein are mean volume average, and the glass transition temperatures (Tg) are calculated according to the Fox equation. As used herein, S1: APE-free, anionic sulfonate surfactant (40% solids),
S2: APE-free, anionic phosphate surfactant (25% solids),
S3: anionic sulfonate surfactant (23% solids),
S4: anionic phosphate surfactant (80% solids),
WAM: wet adhesion monomer (50% solids)
TBH: t-butyl hydroperoxide
AWC: formaldehyde free reducing agent comprising disodium salts of 2-hydroxy-2-sufinatoacetic acid and 2-hydroxy-2-sufonatoacetic acid, and sodium sulfite
MAA: methacrylic acid
MMA: methyl methacrylic monomer
BA: butyl acrylic monomer.

The water retaining monomer used in these experiments is a methoxy polyethylene glycol 750 methacrylate (50% solids in water) (MPEG750), and is commercially available from Evonik Industries. The molecular weight of this water retaining monomer is about 818 grams/mole with 17 units of ethylene oxide. Other than the PEG and WAM monomers, all other monomers are reported as weights of the solids.

Comparative Example 1. Typical Single-Stage Acrylic Emulsion Polymer

| Ingredient | Weight (g) | Procedure |
|---|---|---|
| Reactor Seeding | | Under N2 purge, add water, |
| $H_2O$ | 507 | Surfactant 1 (S1) and buffer |
| $NaHCO_3$ | 1 | agent ($NaHCO_3$) to reactor, |
| S1 | 2 | increase temperature to 75° C. |
| Monomer Emulsion (ME) | | Pre-prepare Monomer |
| $H_2O$ | 415 | Emulsion (ME) |
| S1 | 12 | Add 5% (wt.) of ME to reactor |
| S2 | 46 | Charge seed and Initiator solu- |
| WAM QM-1458 | 26 | tion I to reactor and hold for |
| MAA | 13 | 15 minutes |
| MMA | 593 | Feed the remaining monomer |
| BA | 522 | emulsion and Initiator Solu- |
| $NH_4OH$ | 6 | tion II simultaneously over a |
| Initiator solution I | | period of 3.5 hours |
| $H_2O$ | 15 | After monomer feed, hold re- |
| $Na_2S_2O_8$ | 2 | actor at 75° C. for 1 hour |
| Initiator solution II | | Cool the reactor to 60° C. |
| $Na_2S_3O_8$ | 1 | Feed oxidizing and reducing |
| $H_2O$ | 20 | agent solution simultaneously |
| $H_2O$ (rinse) | 30 | over 30 min. |
| Oxidizing agent Solution | | Cool to room temperature |
| TBH | 2 | (RT), neutralize using $NH_4OH$ |
| $H_2O$ | 20 | solution. |
| Reducing agent solution | | |
| AWC | 2 | |
| $H_2O$ | 20 | |
| $NH_4OH^3$ | 2 | |
| $H_2O$ | 10 | |
| Total grams | 2267 | |

The polymer has a Fox Tg of 11° C., PS = 139 nm and solids content 51.2%.
[3]As used herein, $NH_4OH$ is in a 26% solution.

Example 2. Two-Stage Acrylic Emulsion Polymer with Copolymerized MPEG750 in the Shell

| Ingredient | Weight (g) | Procedure |
|---|---|---|
| Reactor Seeding | | Under $N_2$ purge, add water and |
| $H_2O$ | 507 | Surfactant 1 (S1) and buffer |
| $NaHCO_3$ | 1 | agent ($NaHCO_3$) to reactor, |
| S1 | 2 | increase temperature to 75° C. |
| Monomer Emulsion (ME) | | Pre-prepare Monomer |
| $H_2O$ | 415 | Emulsion (ME) |
| S1 | 12 | Add 5% (wt.) of ME to reactor |
| S2 | 46 | Charge seed and Initiator solu- |
| WAM QM-1458 | 26 | tion I to reactor and hold for |
| MAA | 13 | 15 minutes |
| MMA | 593 | Feed the remaining monomer |
| BA | 522 | emulsion and Initiator Solu- |
| $NH_4OH$ | 6 | tion II simultaneously over a |
| Shell ME | | period of 3.5 hours. |
| MPEG750 | 45 | Add MPEG750 over ME |
| Initiator solution I | | after 75% of ME was feed; |
| $H_2O$ | 15 | Continue feed of monomers. |
| $Na_2S_3O_8$ | 2 | After monomer feed, hold |
| Initiator solution II | | reactor at 75° C. for 1 hour |
| $Na_2S_3O_8$ | 1 | Cool the reactor to 60° C. |
| $H_2O$ | 20 | Feed oxidizing and reducing |
| $H_2O$ (rinse) | 30 | agent solution simultaneously |
| Oxidizing agent Solution | | over 30 min. |
| TBH | 2 | Cool to RT, neutralize using |
| $H_2O$ | 20 | $NH_4OH$ solution. |
| Reducing agent solution | | |
| AWC | 2 | |
| $H_2O$ | 20 | |
| $NH_4OH$ | 2 | |
| $H_2O$ | 10 | |
| Total grams | 2312 | |

The polymer has a Fox Tg of 12° C., PS = 137 nm and solids content 51.7%.

Example 3. Two-Stage Acrylic Emulsion Polymer Copolymerized MPEG750 and Added MMA in shell

| Ingredient | Weight (g) | Procedure |
|---|---|---|
| Reactor Seeding | | Under $N_2$ purge, add water and |
| $H_2O$ | 507 | Surfactant 1 (S1) and buffer |
| $NaHCO_3$ | 1 | agent ($NaHCO_3$) to reactor, |
| S1 | 2 | increase temperature to 75° C. |
| Monomer Emulsion (ME) | | Pre-prepare Monomer |
| H2O | 385 | Emulsion (ME) |

-continued

| Ingredient | Weight (g) | Procedure |
|---|---|---|
| S1 | 12 | Add 5% (wt.) of ME to reactor |
| S2 | 46 | Charge seed and Initiator solution I to reactor and hold for 15 minutes |
| WAM QM-1458 | 26 | |
| MAA | 13 | |
| MMA | 483 | Feed the remaining monomer emulsion and Initiator Solution II simultaneously over a period of 3.5 hours |
| BA | 522 | |
| $NH_4OH$ | 6 | |
| Shell ME | | |
| MPEG750 | 45 | Add Shell ME over last 25% of ME; Continue feed of monomers. |
| MMA | 110 | |
| S1 | 2 | |
| $H_2O$ | 30 | After monomer feed, hold reactor at 75° C. for 1 hour |
| Initiator solution I | | |
| $H_2O$ | 15 | Cool the reactor to 60° C. |
| $Na_2S_3O_8$ | 2 | Feed oxidizing and reducing agent solution simultaneously over 30 min. |
| Initiator solution II | | |
| $Na_2S_3O_8$ | 1 | |
| $H_2O$ | 20 | Cool to RT, neutralize using $NH_4OH$ solution. |
| $H_2O$ (rinse) | 30 | |
| Oxidizing agent Solution | | |
| TBH | 2 | |
| $H_2O$ | 20 | |
| Reducing agent solution | | |
| AWC | 2 | |
| $H_2O$ | 20 | |
| $NH_4OH$ | 2 | |
| $H_2O$ | 10 | |
| Total grams | 2314 | |

The polymer has a Fox Tg of 12° C., PS = 143 nm and solids content 51.9%.

Example 4. Two-Stage Acrylic Emulsion Polymer Copolymerized MPEG750 and Added MMA in Shell

| Ingredient | Weight (g) | Procedure |
|---|---|---|
| Reactor Seeding | | Under $N_2$ purge, add water and Surfactant 1 (S1) and buffer agent (NaHCO3) to reactor, increase temperature to 75° C. |
| $H_2O$ | 507 | |
| $NaHCO_3$ | 1 | |
| S1 | 2 | |
| Monomer Emulsion | | Pre-prepare Monomer Emulsion (ME) |
| $H_2O$ | 385 | |
| S1 | 12 | Add 5% (wt) of ME to reactor |
| S2 | 46 | Charge seed and Initiator solution I to reactor and hold for 15 minutes |
| WAM QM-1458 | 26 | |
| MAA | 13 | |
| MMA | 528 | Feed the remaining monomer emulsion and Initiator Solu tion II simultaneously over a period of 3.5 hours |
| BA | 522 | |
| $NH_4OH$ | 6 | |
| Shell ME | | |
| MPEG750 | 45 | Add Shell ME over last 25% of ME; Continue feed of monomers. |
| MMA | 55 | |
| S1 | 2 | |
| $H_2O$ | 30 | After monomer feed, hold reactor at 75° C. for 1 hour |
| Initiator solution I | | |
| $H_2O$ | 15 | Cool the reactor to 60°C |
| $Na_2S_3O_8$ | 2 | Feed oxidizing and reducing agent solution simultaneously over 30 min. |
| Initiator solution II | | |
| $Na_2S_3O_8$ | 1 | |
| $H_2O$ | 20 | Cool to RT, neutralize using $NH_4OH$ solution. |
| $H_2O$ (rinse) | 30 | |
| Oxidizing agent Solution | | |
| TBH | 2 | |
| $H_2O$ | 20 | |
| Reducing agent solution | | |
| AWC | 2 | |
| $H_2O$ | 20 | |
| $NH_4OH$ | 2 | |
| $H_2O$ | 10 | |
| Total grams | 2304 | |

The polymer has a Fox Tg of 11° C., PS = 143 nm and solids content 51.7%.

Example 5. Two-Stage Acrylic Emulsion Polymer Copolymerized MPEG750 and Added MMA in Shell

| Ingredient | Weight (g) | Procedure |
|---|---|---|
| Reactor Seeding | | Under $N_2$ purge, add water and Surfactant 1 (S1) and buffer agent (NaHCO3) to reactor, increase temperature to 75° C. |
| $H_2O$ | 507 | |
| $NaHCO_3$ | 1 | |
| S1 | 2 | |
| Monomer Emulsion | | Pre-prepare Monomer Emulsion (ME) Add 5% (wt) of ME to reactor |
| $H_2O$ | 375 | |
| S1 | 9 | Charge seed and Initiator solution I to reactor and hold for 15 minutes |
| S2 | 46 | Feed the remaining monomer emulsion and Initiator Solution II simultaneously over a period of 3.5 hours |
| WAMQM-1458 | 26 | |
| MAA | 13 | |
| MMA | 528 | After all ME is fed, charge Shell ME |
| BA | 522 | After monomer feed, hold reactor at 75° C. for 1 hour |
| $NH_4OH$ | 6 | |
| Shell ME | | Cool the reactor to 60° C. |
| MPEG750 | 45 | Feed oxidizing and reducing agent solution simultaneously over 30 min. |
| MMA | 55 | |
| S1 | 4 | Cool to RT, neutralize using $NH_4OH$ solution. |
| $NH_4OH$ | 1 | |
| $H_2O$ | 40 | |
| Initiator solution I | | |
| $H_2O$ | 15 | |
| $Na_2S_3O_8$ | 2 | |
| Initiator solution II | | |
| $Na_2S_3O_8$ | 1 | |
| $H_2O$ | 20 | |
| $H_2O$ (rinse) | 30 | |
| Oxidizing agent Solution | | |
| TBH | 2 | |
| $H_2O$ | 20 | |
| Reducing agent solution | | |
| AWC | 2 | |
| $H_2O$ | 20 | |
| $NH_4OH$ | 2 | |
| $H_2O$ | 10 | |
| Total grams | 2304 | |

The polymer has a Fox Tg of 11° C., PS = 145nm and solids content 51.8%.

Example 6. Two-Stage Acrylic Emulsion Polymer Copolymerized MPEG750 in Shell

| Ingredient | Weight (g) | Procedure |
|---|---|---|
| Reactor Seeding | | Under $N_2$ purge, add water and Surfactant 1 (S1) and buffer agent (NaHCO3) to reactor, increase temperature to 75° C. |
| $H_2O$ | 507 | |
| $NaHCO_3$ | 1 | |
| S1 | 2 | |
| Monomer Emulsion | | Pre-prepare Monomer Emulsion (ME) |

| Ingredient | Weight (g) | Procedure |
|---|---|---|
| (ME) | | Add 5% (wt.) of ME to reactor |
| H$_2$O | 415 | Charge seed and Initiator solution I to |
| S1 | 12 | reactor and hold for 15 minutes |
| S2 | 46 | Feed the remaining monomer emulsion |
| WAM QM-1458 | 26 | and Initiator Solution II simultaneously |
| MAA | 13 | over a period of 3.5 hours |
| MMA | 593 | Add MPEG750 over ME after 75% of |
| BA | 522 | ME was feed; Continue feed of |
| NH$_4$OH | 6 | monomers. |
| Shell ME | | After monomer feed, hold reactor at |
| MPEG750 | 33 | 75° C. for 1 hour |
| Initiator solution I | | Cool the reactor to 60° C. |
| H$_2$O | 15 | Feed oxidizing and reducing agent |
| Na$_2$S$_3$O$_8$ | 2 | solution simultaneously over 30 min. |
| Initiator solution II | | Cool to RT, neutralize using NH$_4$OH |
| Na$_2$S$_3$O$_8$ | 1 | solution. |
| H$_2$O | 20 | |
| H$_2$O (rinse) | 30 | |
| Oxidizing agent Solution | | |
| TBH | 2 | |
| H$_2$O | 20 | |
| Reducing agent solution | | |
| AWC | 2 | |
| H$_2$O | 20 | |
| NH$_4$OH | 2 | |
| H$_2$0 | 10 | |
| Total grams | 2300 | |

The polymer has a Fox Tg of 11° C., PS = 134 nm and solids content 51.6%.

Example 7. Two-Stage Acrylic Emulsion Polymer Copolymerized MPEG750 in Shell

| Ingredient | Weight (g) | Procedure |
|---|---|---|
| Reactor Seeding | | Under N$_2$ purge, add water and |
| H$_2$O | 507 | Surfactant 1 (S1) and buffer agent |
| NaHCO$_3$ | 1 | (NaHCO$_3$) to reactor, increase |
| S1 | 2 | temperature to 75° C. |
| Monomer Emulsion | | Pre-prepare Monomer Emulsion (ME) |
| (ME) | | Add 5% (wt) of ME to reactor |
| H$_2$O | 415 | Charge seed and Initiator solution I to |
| S1 | 12 | reactor and hold for 15 minutes |
| S2 | 46 | Feed the remaining monomer emulsion |
| WAM QM-1458 | 26 | and Initiator Solution II simultaneously |
| MAA | 13 | over a period of 3.5 hours |
| MMA | 593 | Add MPEG750 over ME after 75% of |
| BA | 522 | ME was feed; Continue feed of |
| NH$_4$OH | 6 | monomers. |
| Shell ME | | After monomer feed, hold reactor at |
| MPEG750 | 25 | 75° C. for 1 hour |
| Initiator solution I | | Cool the reactor to 60° C. |
| H$_2$O | 15 | Feed oxidizing and reducing agent |
| Na$_2$S$_3$O$_8$ | 2 | solution simultaneously over 30 min. |
| Initiator solution II | | Cool to RT, neutralize using NH$_4$OH |
| Na$_2$S$_3$O$_8$ | 1 | solution. |
| H$_2$O | 20 | |
| H$_2$O (rinse) | 30 | |
| Oxidizing agent Solution | | |
| TBH | 2 | |
| H$_2$O | 20 | |
| Reducing agent solution | | |
| AWC | 2 | |
| H$_2$O | 20 | |
| NH$_4$OH | 2 | |
| H$_2$0 | 10 | |
| Total grams | 2292 | |

The polymer has a Fox Tg of 11° C., PS = 135 nm and solids content 50.6%.

Example 8. Two-Stage Acrylic Emulsion Polymer Copolymerized MPEG750 and Added MMA in Shell

| Ingredient | Weight (g) | Procedure |
|---|---|---|
| Reactor Seeding | | Under N$_2$ purge, add water and |
| H$_2$O | 507 | Surfactant 1 (S1) and buffer agent |
| NaHCO$_3$ | 1 | (NaHCO$_3$) to reactor, increase |
| S1 | 2 | temperature to 75° C. |
| Monomer Emulsion | | Pre-prepare Monomer Emulsion (ME) |
| H$_2$O | 385 | Add 5% (wt.) of ME to reactor |
| S1 | 12 | Charge seed and Initiator solution I to |
| S2 | 46 | reactor and hold for 15 minutes |
| WAM QM-1458 | 26 | Feed the remaining monomer |
| MAA | 13 | emulsion and Initiator Solution II |
| MMA | 483 | simultaneously over a period of 3.5 |
| BA | 522 | hours |
| NH$_4$OH | 6 | Add Shell ME over last 25% of ME; |
| Shell ME | | Continue feed of monomers. |
| MPEG750 | 33 | After monomer feed, hold reactor at |
| MMA | 110 | 75° C. for 1 hour |
| S1 | 2 | Cool the reactor to 60° C. |
| H$_2$O | 30 | Feed oxidizing and reducing agent |
| Initiator solution I | | solution simultaneously over 30 min. |
| H$_2$O | 15 | Cool to RT, neutralize using NH$_4$OH |
| Na2S$_3$O$_8$ | 2 | solution. |
| Initiator solution II | | |
| Na$_2$S$_3$O$_8$ | 1 | |
| H$_2$O | 20 | |
| H$_2$O (rinse) | 30 | |
| Oxidizing agent Solution | | |
| TBH | 2 | |
| H$_2$O | 20 | |
| Reducing agent solution | | |
| AWC | 2 | |
| H$_2$O | 20 | |
| NH$_4$OH | 2 | |
| H$_2$0 | 10 | |
| Total grams | 2302 | |

The polymer has a Fox Tg of 11° C, PS = 141 nm and solids content 51.7%.

Example 9. Two-Stage Acrylic Emulsion Polymer Copolymerized MPEG750 and Added MMA in Shell

| Ingredient | Weight (g) | Procedure |
|---|---|---|
| Reactor Seeding | | Under N$_2$ purge, add water and |
| H$_2$O | 507 | Surfactant 1 (S1) and buffer agent |
| NaHCO$_3$ | 1 | (NaHCO$_3$) to reactor, increase |
| S1 | 2 | temperature to 75° C. |
| Monomer Emulsion | | Pre-prepare Monomer Emulsion |
| H$_2$O | 385 | (ME) |
| S1 | 12 | Add 5% (wt.) of ME to reactor |

-continued

| Ingredient | Weight (g) | Procedure |
|---|---|---|
| S2 | 46 | Charge seed and Initiator solution I to |
| WAM QM-1458 | 26 | reactor and hold for 15 minutes |
| MAA | 13 | Feed the remaining monomer |
| MMA | 483 | emulsion and Initiator Solution II |
| BA | 522 | simultaneously over a period of 3.5 |
| NH$_4$OH | 6 | hours |
| Shell ME | | Add Shell ME over last 25% of ME; |
| MPEG750 | 25 | Continue feed of monomers. |
| MMA | 110 | After monomer feed, hold reactor at |
| S1 | 2 | 75° C. for 1 hour |
| H$_2$O | 30 | Cool the reactor to 60° C. |
| Initiator solution I | | Feed oxidizing and reducing agent |
| H$_2$O | 15 | solution simultaneously over 30 min. |
| Na$_2$S$_3$O$_8$ | 2 | Cool to RT, neutralize using NH$_4$OH |
| Initiator solution II | | solution. |
| Na$_2$S$_3$O$_8$ | 1 | |
| H$_2$O | 20 | |
| H$_2$O (rinse) | 30 | |
| Oxidizing agent Solution | | |
| TBH | 2 | |
| H$_2$O | 20 | |
| Reducing agent solution | | |
| AWC | 2 | |
| H$_2$O | 20 | |
| NH$_4$OH | 2 | |
| H$_2$0 | 10 | |
| Total grams | 2294 | |

The polymer has a Fox Tg of 11° C., PS = 138 nm and solids content 51.4%.

Another set of experiments was conducted on primer-type paint compositions, which have MAA, MMA, BA and 2-ethylhexylacrylate (2EHA). Styrene and/or MPEG750 is added to ascertain a freeze-thaw capability.

Comparative Example 10. Typical Single-Stage Acrylic Emulsion Polymer for Primer Paints

| Ingredient | Weight (g) | Procedure |
|---|---|---|
| Reactor Seeding | | Under N$_2$ purge, add water and |
| H$_2$O | 507 | Surfactant 1 (S3) and buffer agent |
| NaHCO$_3$ | 1 | (NaHCO$_3$) to reactor, increase |
| S3 | 7 | temperature to 75° C. |
| Monomer Emulsion | | Pre-prepare Monomer Emulsion |
| H$_2$O | 220 | (ME) |
| S3 | 27 | Add 5% (wt.) of ME to reactor |
| S4 | 10 | Charge seed and Initiator solution I to |
| WAM QM-1458 | 22 | reactor and hold for 15 minutes |
| MAA | 12 | Feed the remaining monomer |
| MMA | 330 | emulsion and Initiator Solution II |
| BA | 363 | simultaneously over a period of 3.5 |
| 2EHA | 211 | hours |
| Initiator solution 1 | | After monomer feed, hold reactor at |
| HO | 15 | 75° C. for 1 hour |
| Na$_2$S$_3$O$_8$ | 1 | Cool the reactor to 60° C. |
| Initiator solution II | | Feed oxidizing and reducing agent |
| Na$_2$S$_3$O$_8$ | 1 | solution simultaneously over 30 min. |
| H$_2$O | 51 | Cool to RT, neutralize using NH$_4$OH |
| H$_2$O (rinse) | 34 | solution. |
| Oxidizing agent Solution | | |
| TBH | 2 | |
| H$_2$O | 15 | |
| Reducing agent solution | | |
| AWC | 2 | |
| H$_2$O | 10 | |
| NH$_4$OH | 2 | |
| H$_2$0 | 14 | |
| Total grams | 1857 | |

The polymer has a Fox Tg of −9° C, PS = 155 nm and solids content 46.7%.

Example 11. Two-Stage Acrylic Emulsion Polymer Copolymerized MPEG750 and Added MMA in Shell

| Ingredient | Weight (g) | Procedure |
|---|---|---|
| Reactor Seeding | | Under N$_2$ purge, add water and |
| H$_2$O | 507 | Surfactant 1 (S3) and buffer agent |
| NaHCO$_3$ | 1 | (NaHCO$_3$) to reactor, increase |
| S3 | 7 | temperature to 75° C. |
| Monomer Emulsion | | Pre-prepare Monomer Emulsion |
| H$_2$O | 220 | (ME) |
| S3 | 27 | Add 5% (wt.) of ME to reactor |
| S4 | 10 | Charge seed and Initiator solution I to |
| WAM QM-1458 | 22 | reactor and hold for 15 minutes |
| MAA | 12 | Feed the remaining monomer |
| MMA | 161 | emulsion and Initiator Solution II |
| BA | 363 | simultaneously over a period of 3.5 |
| 2EHA | 211 | hours |
| Shell ME | | Add Shell ME over last 30% of ME; |
| MPEG750 | 14 | Continue feed of monomers. |
| MMA | 169 | After monomer feed, hold reactor at |
| Initiator solution I | | 75° C. for 1 hour |
| H$_2$O | 34 | Cool the reactor to 60° C. |
| Na$_2$S$_3$O$_8$ | 1 | Feed oxidizing and reducing agent |
| Initiator solution II | | solution simultaneously over 30 min. |
| Na$_2$S$_3$O$_8$ | 1 | Cool to RT, neutralize using NH$_4$OH |
| H$_2$O | 51 | solution. |
| H$_2$O (rinse) | 34 | |
| Oxidizing agent Solution | | |
| TBH | 2 | |
| H$_2$O | 25 | |
| Reducing agent solution | | |
| AWC | 2 | |
| H$_2$O | 25 | |
| NH$_4$OH | 2 | |
| H$_2$0 | 10 | |
| Total grams | 1911 | |

The polymer has a Fox Tg of −11° C., PS = 109 nm and solids content 47.7%.

Example 12. Multi-Stage Styrene-Acrylic Polymer Copolymerized with MPEG750 in Shell and no MMA

| Ingredient | Weight (g) | Procedure |
|---|---|---|
| Reactor Seeding | | Under N$_2$ purge, add water and |
| H$_2$O | 325 | Surfactant 1 (S1) and buffer agent |
| NaHCO$_3$ | 1 | (NaHCO$_3$) to reactor, increase |
| Monomer Emulsion | | temperature to 75° C. |
| H$_2$O | 175 | Pre-prepare Monomer Emulsion |
| S3 | 24 | (ME) |
| S4 | 16 | Add 5% (wt.) of ME to reactor |
| WAM QM-1458 | 10 | Charge seed and Initiator solution I to |
| MAA | 3 | reactor and hold for 15 minutes |

-continued

| Ingredient | Weight (g) | Procedure |
|---|---|---|
| Styrene | 130 | Feed the remaining monomer |
| BA | 230 | emulsion and Initiator Solution II |
| 2EHA | 127 | simultaneously over a period of 3.5 |
| Shell ME | | hours |
| MPEG750 | 20 | Add Shell ME over last 20% of ME; |
| Styrene | 68 | Continue feed of monomers. |
| IOMP[2] | 1 | After monomer feed, hold reactor at |
| MAA | 6 | 75° C. for 1 hour |
| Initiator solution I | | Cool the reactor to 60° C. |
| HO | 16 | Feed oxidizing and reducing agent |
| NazSOs | 1 | solution simultaneously over 30 min. |
| Initiator solution II | | Cool to RT, neutralize using NH$_4$OH |
| NazSOs | 1 | solution. |
| HO | 16 | |
| H2O (rinse) | 10 | |
| Oxidizing agent Solution | | |
| TBH | 1 | |
| HO | 15 | |
| Reducing agent solution | | |
| AWC | 1 | |
| HO | 12 | |
| NHOH | 2 | |
| H20 | 5 | |
| Total grams | | |

The polymer has a Fox Tg of −11° C., PS = 111 nm and solids content 48.9%.
[2] Iso-octyl 3-mercaptopropionate chain transfer agent.

Example 13. Multi-Stage Styrene-Acrylic Polymer Copolymerized with MPEG750 and MMA in Shell

| Ingredient | Weight (g) | Procedure |
|---|---|---|
| Reactor Seeding | | Under N$_2$ purge, add water and |
| H$_2$O | 325 | Surfactant 1 (S1) and buffer agent |
| NaHCO$_3$ | 1 | (NaHCO$_3$) to reactor, increase |
| S3 | 2 | temperature to 75° C. |
| Monomer Emulsion | | Pre-prepare Monomer Emulsion |
| H$_2$O | 160 | (ME) |
| S3 | 24 | Add 5% (wt.) of ME to reactor |
| S4 | 16 | Charge seed and Initiator solution I to |
| WAM QM-1458 | 10 | reactor and hold for 15 minutes |
| MAA | 3 | Feed the remaining monomer |
| Styrene | 130 | emulsion and Initiator Solution II |
| BA | 230 | simultaneously over a period of 3.5 |
| 2EHA | 127 | hours |
| Shell ME | | Add Shell ME over last 20% of ME; |
| MPEG750 | 20 | Continue feed of monomers. |
| Styrene | 31 | After monomer feed, hold reactor at |
| MMA | 37 | 75° C. for 1 hour |
| IOMP[2] | 1 | Cool the reactor to 60° C. |
| MAA | 6 | Feed oxidizing and reducing agent |
| Initiator solution I | | solution simultaneously over 30 min. |
| H$_2$O | 16 | Cool to RT, neutralize using NH$_4$OH |
| Na$_2$S$_3$O$_8$ | 1 | solution. |
| Initiator solution II | | |
| Na$_2$S$_3$O$_8$ | 1 | |
| H$_2$O | 16 | |
| H$_2$O (rinse) | 10 | |
| Oxidizing agent Solution | | |
| TBH | 1 | |
| H$_2$O | 15 | |
| Reducing agent solution | | |
| AWC | 1 | |
| H$_2$O | 12 | |
| NH$_4$OH | 2 | |
| H$_2$0 | 5 | |
| Total grams | 1203 | |

The polymer has a Fox Tg of −11° C., PS = 190 nm and solids content 47.4%.

As discussed above, optionally the film forming latex particles may have a self-crosslinking moiety, so that after the architectural composition is applied to a substrate and the aqueous component evaporates the self-crosslinking moiety crosslinks with a cross-linking agent residing in the aqueous phase. Cross-linking can improve the toughness of the dried paint film, e.g., to improve its resistance to scrubbing or to have improved scrubability. A suitable self-crosslinking moiety is formed by monomers, such as diacetone acrylamide ("DAAM") and suitable cross-linking agents include adipic acid dihydrazide ("ADH"). Other suitable crosslinkable monomers, such as diacetone methacrylamide (DAMAM), acetoacetoxyethyl methacrylate (AAEM) and/or allyl methyl acrylate (AMA), can be co-polymerized with film forming monomers to produce self-crosslinkable film forming latex particles.

It has been reported that the cross-linking of polymers comprising DAAM with ADH cross-linking agent through a keto-hydrazide reaction has a substantial reaction rate in an aqueous solution. ("The diacetone acrylamide cross-linking reaction and its influence on the film formation of an acrylic latex", Journal of Coatings Technology and Research, 5(3), 285-297, 2008.) To minimize this premature cross-linking, the ADH hydrazine is substantially substituted with hydrazone(s) or blocked hydrazine particles discussed in commonly owned United States published patent application No. 2012/0142847 and in commonly owned U.S. Pat. No. 9,040,617, which are incorporated herein by reference in their entireties. The hydrazone crosslinking particles do not react with the DAAM moiety during storage, and are converted to hydrazine crosslinking particles when the aqueous component evaporates after application to a substrate.

Another way to minimize premature cross-linking during storage is to substantially remove the hydrazine (ADH) cross-linking agents and to introduce a second crosslinkable moiety, such as methacrylamide (MAM) and/or acrylamide (AM) monomer, on the latex particles. This second cross-linkable monomer is copolymerized as part of the latex particles and functions as another self-crosslinking moiety to the film forming latex particles. A small amount of hydrazine cross-linking agent, e.g., below its stoichiometric ratio with DAAM, can remain in the aqueous phase. Latex particles with multiple crosslinkable moieties are disclosed in commonly owned United States published patent application Nos. US 2014/0323635, and US 2014/0228514.

The core may be polymerized with crosslinking monomers, e.g. 1,4-butanediol diacrylate, in the pre-emulsion composition. Alternatively, crosslinkable monomers such as diacetone acrylamide (DAAM) are present and are co-polymerized in the first stage pre-emulsion composition. The crosslinking monomers cross-link the core during the polymerization process. On the other hand, the crosslinkable monomers remain un-crosslinked while in the aqueous phase and become cross-linked after being applied to a surface and the water evaporates. The crosslinked monomer of the core polymer imparts improved hardness and weathering property to the resulting latex. The shell should have the crosslinkable monomers co-polymerized thereon. After being applied on to a substrate, the crosslinkable monomers in the shell crosslink to other latex particles to form a film. The core may also have cross-linkable monomers polymerized thereon.

The first and second crosslinkable monomers, which are also polymerized as part of the core, if present, and shell, respectively, are selected from the group consisting of diacetone acrylamide (DAAM), diacetone methacrylamide (DAMAM) and acetoacetoxyethyl methacrylate (AAEM) or the like or a combination thereof. The aqueous composition that suspends the core-shell latex preferably comprises 0.5-2.5 wt. % of a cross-linking agent, such as adipic dihydrazide relative to the amount of crosslinkable monomers. The cross-linking agent in the aqueous composition typically is not polymerized as a moiety on the core-shell latex. The ratio of the crosslinkable monomer in the shell to the crosslinking agent in the aqueous composition is about 2:1.

The glass transition temperature Tg is preferably determined by the Fox equation. When the polymers are copolymers, the overall $T_g$ of a particular layer of copolymers can be calculated by applying the $T_g$ value of the homopolymer derived from each monomer to the Fox Equation:

$$(1/T_g) = (W_a/T_{ga}) + (W_b/T_{gb}) + \ldots + (W_i/T_{gi}), \text{ wherein}$$

$W_1, W_2, \ldots$ and $W_i$=weight percentages of monomers "a", "b", ..., and "i"

$T_{ga}, T_{gb} \ldots$ and $T_{gi}=T_g$ values of monomers "a", "b", ..., and "i"

See U.S. Pat. No. 6,723,779 and International Publication No. WO 94/04581 for the application of the Fox Equation to the calculation of the Tg values of copolymers; see also any edition of the Polymer Handbook such as the $3^{rd}$ ed. (1989). The disclosures of the '779 patent and the '581 publication and of the Polymer Handbook are incorporated herein by reference in their entireties. Alternatively, $T_g$ values can be measured using the differential scanning calorimetry (DSC) technique, or other known techniques. In general, the Tg is influenced by the types of monomers used within a polymer and thus although the polymers of the core and shell have similar average molecular weights their Tg's can be different. Unless otherwise specified Tg are determined by the Fox equation.

The inventive aqueous latex composition of the present invention can be incorporated into a paint composition, preferably a topcoat paint composition. A typical paint composition is illustrated below.

| Description of Components | Weight (lbs.) for 100 gallons composition |
| --- | --- |
| Inventive Latex | 396.72 |
| PEG400/Water Float | 1.587 |
| Defoamer | 8.936 |
| Mildewcide | 1 |
| Preservative | 2 |
| Biocide | 0.5 |
| Ammonia | 0.935 |
| Coalescent Aid | 17 |
| Extender 1 | 15 |
| Extender/Filler 2 | 77 |
| Extender 3 | 10 |
| Extender 4 | 45 |
| TiO$_2$ | 269 |
| Rheological Modifier 1 | 13.5 |
| Associated Thickener | 1.625 |
| Rheological Modifier 2 | 3 |
| Water | 255.93 |
| Dispersant 1 | 10 |

| Description of Components | Weight (lbs.) for 100 gallons composition |
| --- | --- |
| Anionic surfactant | 1.05 |
| Non-ionic surfactant | 4.4 |
| Dispersant 2 | 1.78 |

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

We claim:

1. An aqueous latex composition comprising an acrylic core-shell latex, wherein acrylic monomers are present at greater than 95% of all film forming monomers and wherein a water-retaining monomer is copolymerized to the shell,
   wherein the Tg of the core ranges from about 0° C. to about 12° C., the Tg of the shell ranges from about 13° C. to about 40° C.,
   wherein the mean volume average particle size of the core-shell latex ranges from about 125 nm to about 200 nm, and
   wherein the core-shell latex comprises at least one acrylic monomer having a solubility that ranges from about 10 g/L to about 30 g/L at 30° C., and present in the shell polymer in an amount greater than about 50 wt. % of all monomers in the shell, and
   wherein the water-retaining monomer is present in the shell in an amount from about 1.43% to about 5% by weight of the core-shell latex.

2. The aqueous latex composition of claim 1, wherein the at least one acrylic monomer is methyl methacrylate.

3. The aqueous latex composition of claim 1, wherein the Tg of the shell is higher than the Tg of the core by at least about 3° C.

4. The aqueous latex composition of claim 3, wherein the Tg of the shell is higher than the Tg of the core by at least about 10° C.

5. The aqueous latex composition of claim 4, wherein the Tg of the shell is higher than the Tg of the core by at least about 20° C.

6. The aqueous latex composition of claim 1, wherein the particle size of the core-shell latex ranges from about 125 nm to about 175 nm.

7. The aqueous latex composition of claim 6, wherein the particle size of the core-shell latex ranges from about 130 nm to about 160 nm.

8. The aqueous latex composition of claim 7, wherein the particle size of the core-shell latex ranges from about 130 nm to about 150 nm.

9. The aqueous latex composition of claim 1, wherein the solubility of the at least one acrylic monomer ranges from about 12 g/L to about 18 g/L.

10. The aqueous latex composition of claim 9, wherein the solubility of the at least one acrylic monomer ranges from about 14 g/L to about 16 g/L.

11. The aqueous latex composition of claim 1, wherein the at least one acrylic monomer is present in the shell polymer in an amount greater than about 55 wt. %.

12. The aqueous latex composition of claim 11, wherein the at least one acrylic monomer is present in the shell polymer in an amount greater than about 60 wt. %.

13. The aqueous latex composition of claim 12, wherein the at least one acrylic monomer is present in the shell polymer in an amount greater than about 65 wt. %.

14. The aqueous latex composition of claim 1, wherein the water-retaining monomer comprises an ethylene oxide.

15. The aqueous latex composition of claim 1, wherein the water-retaining monomer comprises a propylene oxide.

\* \* \* \* \*